(12) United States Patent
Ma et al.

(10) Patent No.: US 12,150,150 B2
(45) Date of Patent: Nov. 19, 2024

(54) UE CAPABILITY REPORTING METHOD, APPARATUS, AND SYSTEM

(71) Applicant: HUAWEI TECHNOLOGIES CO., LTD., Shenzhen (CN)

(72) Inventors: Shuo Ma, Beijing (CN); Hongqiang Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 17/826,473

(22) Filed: May 27, 2022

(65) Prior Publication Data
US 2022/0303975 A1    Sep. 22, 2022

Related U.S. Application Data

(63) Continuation of application No. PCT/CN2019/121653, filed on Nov. 28, 2019.

(51) Int. Cl.
    H04W 72/04      (2023.01)
    H04W 72/0453    (2023.01)
    H04W 72/51      (2023.01)
    H04W 88/06      (2009.01)

(52) U.S. Cl.
    CPC ....... *H04W 72/51* (2023.01); *H04W 72/0453* (2013.01); *H04W 88/06* (2013.01)

(58) Field of Classification Search
    CPC .. H04W 72/51; H04W 72/0453; H04W 88/06
    See application file for complete search history.

(56) References Cited

U.S. PATENT DOCUMENTS

2017/0171903 A1   6/2017   Kubota et al.
2019/0150031 A1   5/2019   Balasubramanian et al.

FOREIGN PATENT DOCUMENTS

| CN | 108141332 A | 6/2018 |
|----|-------------|--------|
| CN | 108337695 A | 7/2018 |
| CN | 109951895 A | 6/2019 |
| CN | 110049556 A | 7/2019 |

(Continued)

OTHER PUBLICATIONS

NTT Docomo, Inc., R2-1702680, 'UE capability coordination for LTE-NR Dual Connectivity', 3GPP TSG-RAN WG2 #97bis, Apr. 3-7, 2017, pp. 1-6. (Year: 2017).*

(Continued)

*Primary Examiner* — Melvin C Marcelo
(74) *Attorney, Agent, or Firm* — Maier & Maier, PLLC

(57) ABSTRACT

A user equipment (UE) capability reporting method and apparatus to improve a success rate of UE rollback configuration to a CA mode and improve transmission bandwidth of UE. The UE may report, based on received first capability enquiry request information, second capability enquiry request information, and multi-RAT request condition, a second band combination in a first RAT and a second multi-RAT band combination in the first RAT and a second RAT. The second multi-RAT band combination, which meets the multi-RAT request condition, is used to configure the UE to be in a multi-RAT multi-connectivity mode of the first RAT and the second RAT. In a process in which the UE reports the second band combination, the UE preferentially reports a first CA band combination.

20 Claims, 6 Drawing Sheets

---

Receive first capability enquiry request information, second capability enquiry request information, and a multi-RAT request condition — 501

Preferentially report a first CA band combination in the first band combination based on the first capability enquiry request information and the multi-RAT request condition — 502

Report a second multi-RAT band combination in the first multi-RAT band combination based on the second capability enquiry request information and the multi-RAT request condition — 503

(56) References Cited

FOREIGN PATENT DOCUMENTS

| EP | 3745771 A1 | 12/2020 |
|---|---|---|
| JP | 2017092827 A | 5/2017 |
| JP | 2019092046 A | 6/2019 |
| WO | 2017088499 A1 | 6/2017 |
| WO | 2018064068 A1 | 4/2018 |
| WO | 2019109358 A1 | 6/2019 |
| WO | 2019146542 A1 | 8/2019 |

OTHER PUBLICATIONS

Rapporteur (ZTE Corporation), "Introduction of NR-DC", 3GPP TSG-RAN WG2 Meeting #103bis, R2-1814893, Chengdu, China, Sep. 8-12, 2018, 15 pages.

Nokia et al., "Clarification on UE Capability Request Filtering", 3GPP TSG-RAN WG2 Meeting #105, R2-1902626, Athens, Greece, Feb. 25-Mar. 1, 2018, 6pages.

\* cited by examiner

UE CAPABILITY REPORTING METHOD, APPARATUS, AND SYSTEM

CROSS-REFERENCE TO RELATED APPLICATIONS

This application is a continuation of International Application No. PCT/CN2019/121653, filed on Nov. 28, 2019, the disclosure of which is hereby incorporated by reference in its entirety.

TECHNICAL FIELD

The embodiments relate to the communication field and a UE capability reporting method, apparatus, and system.

BACKGROUND

With rapid development of mobile Internet, a requirement for bandwidth of a wireless network that provides a data channel is increasingly higher. A carrier aggregation (CA) technology and a multi-connectivity (including dual connectivity) technology emerge as the times require. The CA technology may enable user equipment (UE) to simultaneously perform data transmission on a plurality of carriers, thereby providing a wider data channel for the UE. A multi-connectivity mode generally includes one master base station and at least one secondary base station. The master base station and the secondary base station may jointly serve same UE. The multi-connectivity technology may allow the UE to be simultaneously connected to a master cell group (MCG) and a secondary cell group (SCG) by respectively using the master base station and the secondary base station, to significantly improve a throughput of each user. Generally, multi-connectivity in which the master base station and the secondary base station belong to base stations of different radio access technology (RAT) types is referred to as multi-RAT multi-connectivity.

FIG. 1 is a schematic diagram of a UE capability transfer procedure. An objective of the procedure is to transfer a radio access capability of UE from the UE to a radio access network. FIG. 1 uses an example in which the radio access network is an evolved universal terrestrial radio access network (E-UTRAN). As shown in step 101, an access network device in the E-UTRAN, for example, an evolved NodeB (eNB), may send a UE capability enquiry request message (for example, a UECapabilityEnquiry message) to the UE in a radio resource control (RRC) connected state, to request to obtain radio access capability information of the UE, for example, whether the UE supports evolved universal terrestrial radio access (E-UTRA), new radio (NR), multi-RAT multi-connectivity (for example, multi-RAT dual connectivity, MRDC), and the like. In response to the UE capability enquiry request message, as shown in step 102, the UE may send a UE capability information message (for example, a UECapabilityInformation message) to the eNB, to report information about a radio access capability supported by the UE. For example, in a protocol of 3GPP TS 36.331 V15.6.0, if the UE capability enquiry request message carries a field "eutra" and the UE supports E-UTRA, the UE may report UE radio access capability information in E-UTRA, for example, a band combination supported by the UE in E-UTRA. If the UE capability enquiry request message carries a field "nr" and the UE supports NR, the UE may report UE radio access capability information in NR, for example, a band combination supported by the UE in NR. If the UE capability enquiry request message carries a field "eutra-nr" and the UE supports dual connectivity between E-UTRA and NR (or written as E-UTRA-NR) (EN-DC or NE-DC for short), the UE may report UE radio access capability information in E-UTRA and NR, for example, a band combination supported by the UE in E-UTRA and NR. Because the band combination includes both a carrier in E-UTRA and a carrier in NR, the band combination may be referred to as a multi-RAT band combination. For MRDC between E-UTRA and NR, the multi-RAT band combination may be more referred to as an MRDC band combination.

After the eNB receives the UE capability information message, the eNB may perform corresponding configuration on the UE based on a network status and the information about the radio access capability supported by the UE. For example, the eNB may configure the UE to be in an MRDC mode based on a current network status and the MRDC band combination reported by the UE. If a band combination that is reported by the UE and supported in E-UTRA includes a CA band combination, it indicates that the UE supports CA, and the eNB may configure the UE to be in a CA mode based on the current network status and the CA band combination reported by the UE.

Because the information about the radio access capability supported by the UE is generally relatively large, to avoid excessive uplink overheads of the UE capability information message, a size of UE capability information reported by the UE is generally limited. In this case, in a process of reporting the UE capability information, radio access capability information selected by the UE to be reported affects a configuration of the UE in the access network, for example, affects a success rate of configuring the UE to be in the CA mode or the MRDC mode. Therefore, transmission bandwidth of the UE is affected. However, currently, there is no optimization solution for the process of reporting the UE capability information. This is not conducive to improvement of the transmission bandwidth of the UE, thereby affecting user experience.

SUMMARY

Embodiments provide a UE capability reporting method, apparatus, and system to optimize a process of reporting UE capability information, to improve a success rate of UE rollback configuration to a CA mode, thereby helping improve transmission bandwidth of UE, and further improving user experience of the UE.

A first aspect of the embodiments provides a UE capability reporting method. In the method provided in the first aspect, UE may receive first capability enquiry request information, second capability enquiry request information, and a multi-RAT request condition. For example, the UE may receive the first capability enquiry request information, the second capability enquiry request information, and the multi-RAT request condition that are carried in a UE capability enquiry request message (for example, a UECapabilityEnquiry message).

An access network device may send the UE capability enquiry request message to the UE, to request to obtain some necessary information of the UE, for example, radio access capability (ue-CapacityRAT) information of the UE. In this embodiment, an example in which the UE capability enquiry request message includes the first capability enquiry request information and the second capability enquiry request information is used. The first capability enquiry request information is used to indicate the UE to report a band combination supported by the UE in a first RAT. The second capability enquiry request information is used to request the UE to report a multi-RAT band combination supported by the UE in the first RAT and a second RAT.

To reduce waste of uplink resources, the access network device generally adds a request condition to the UE capability enquiry request message, to indicate the UE to filter out, in a process of reporting UE capability information, UE capability information that does not meet the request condition. For example, the UE capability enquiry request message generally includes a multi-RAT request condition. The second capability enquiry request information and the multi-RAT request condition are used to indicate the UE to report a multi-RAT band combination that is supported by the UE in the first RAT and the second RAT and that meets the multi-RAT request condition. The multi-RAT request condition is used to indicate a condition that needs to be met by a multi-RAT band combination reported by the UE, to indicate the UE to filter out, in a process of reporting a multi-RAT band combination, a multi-RAT band combination that does not meet the multi-RAT request condition.

For ease of description, one or more band combinations supported by the UE in the first RAT are referred to as a first band combination, and one or more multi-RAT band combinations that are supported by the UE in the first RAT and the second RAT and that meet the multi-RAT request condition are referred to as a first multi-RAT band combination. Generally, the UE supports a plurality of band combinations in the first RAT and supports a plurality of multi-RAT band combinations in the first RAT and the second RAT.

Any band combination in the first band combination includes only one or more carriers of the first RAT. A band combination that includes a plurality of carriers may be referred to as a CA band combination.

Any multi-RAT band combination in the first multi-RAT band combination includes both one or more carriers of the first RAT and one or more carriers of the second RAT. It may be considered that any multi-RAT band combination includes a band combination in the first RAT and a band combination in the second RAT. For a multi-RAT band combination that includes a plurality of carriers of the first RAT, it may be considered that the multi-RAT band combination includes a CA band combination in the first RAT.

After the UE receives the UE capability enquiry request message, because the UE capability enquiry request message includes the first capability enquiry request information, if the UE supports the first RAT, the UE may report one or more band combinations (referred to as a second band combination) in the first band combination. If the UE supports CA in the first RAT, the first band combination may include a CA band combination. In addition, because the UE capability enquiry request message includes the multi-RAT request condition, the UE may preferentially report a first CA band combination in the first band combination based on the first capability enquiry request information and the multi-RAT request condition in a process of reporting the second band combination. A priority of reporting the first CA band combination is higher than a priority of reporting a second CA band combination in the first band combination. The second CA band combination does not meet the multi-RAT request condition. The first CA band combination is one or more CA band combinations that meet the multi-RAT request condition, and the first CA band combination may be used to configure the UE to be in a CA mode of the first RAT.

After the UE receives the UE capability enquiry request message, because the UE capability enquiry request message includes the second capability enquiry request information and the multi-RAT request condition, if the UE supports multi-RAT multi-connectivity between the first RAT and the second RAT, the UE may report one or more multi-RAT band combinations (referred to as a second multi-RAT band combination) in the first multi-RAT band combination based on the second capability enquiry request information and the multi-RAT request condition. Any multi-RAT band combination in the second multi-RAT band combination meets the multi-RAT request condition. It may be understood that, for any multi-RAT band combination in the second multi-RAT band combination, a band combination in the first RAT in the multi-RAT band combination meets the multi-RAT request condition, and a band combination in the second RAT in the multi-RAT band combination meets the multi-RAT request condition.

It is assumed that the access network device configures the UE to be in a multi-RAT multi-connectivity mode of the first RAT and the second RAT based on a fourth multi-RAT band combination in the second multi-RAT band combination, where a RAT type of an MCG is the first RAT, and a RAT type of an SCG is the second RAT. A band combination in the first RAT in the fourth multi-RAT band combination is a CA band combination (referred to as a component CA band combination). In this case, in a procedure in which the access network device deletes the SCG of the second RAT, if the second band combination reported by the UE includes the component CA band combination, the access network device may configure, based on the component CA band combination, the UE to roll back to the CA mode. Both the component CA band combination and the first CA band combination preferentially reported by the UE meet the multi-RAT request condition. Therefore, compared with another band combination in the first band combination, the first CA band combination is more likely to include the component CA band combination. It may be understood that, in the method provided in the first aspect, the UE preferentially reports the first CA band combination, to help improve a possibility that the second band combination (that is, a band combination that is in the first RAT and that is reported by the UE) includes the component CA band combination, thereby helping improve a possibility that the UE is configured to roll back to the CA mode of the first RAT, improve network bandwidth of the UE, and improve user experience of the UE.

It should be noted that the UE capability enquiry request message may be one message or may include a plurality of messages. Similarly, the UE may report the second band combination and the second multi-RAT band combination in one UE capability information message or may report the second band combination and the second multi-RAT band combination in a plurality of UE capability information messages. The following describes several situations by using examples.

1. The UE capability enquiry request message may be sent to the UE in a form of one message, and the UE reports the second band combination and the second multi-RAT band combination in one UE capability information message.

2. The UE capability enquiry request message may be sent to the UE in a form of one message, and the UE respectively reports the second band combination and the second multi-RAT band combination in a plurality of UE capability information messages.

For example, in response to the UE capability enquiry request message, the UE may send a UE capability information message (referred to as a first UE capability information message) to the access network device based on the first capability enquiry request information and the multi- RAT request condition in the UE capability enquiry request message, where the first UE capability information message carries the second band combination (preferentially including the first CA band combination) and does not carry the second multi-RAT band combination; and then send a UE capability information message (referred to as a second UE capability information message) to the access network device based on the second capability enquiry request information and the multi-RAT request condition in the UE capability enquiry request message, where the second UE capability information message carries the second multi-RAT band combination and does not carry the second band combination.

Alternatively, for example, in response to the UE capability enquiry request message, the UE may send a first UE capability information message to the access network device, where the first UE capability information message carries the first CA band combination and does not carry the second multi-RAT band combination or a band combination other than the first CA band combination in the second band combination; then send a second UE capability information message to the access network device, where the second UE capability information message carries the band combination other than the first CA band combination in the second band combination and does not carry the second multi-RAT band combination; and then send a third UE capability information message to the access network device, where the third UE capability information message carries the second multi-RAT band combination and does not carry the second band combination.

3. The UE capability enquiry request message may be sent to the UE in a form of a plurality of messages, and the UE reports the second band combination and the second multi-RAT band combination in one UE capability information message.

4. The UE capability enquiry request message may be sent to the UE in a form of a plurality of messages, and the UE reports the second band combination and the second multi-RAT band combination in a plurality of UE capability information messages.

For example, a first UE capability enquiry request message carries first UE capability enquiry request information and the multi-RAT request condition and does not carry second UE capability enquiry request information. In response to the first UE capability enquiry request message, the UE may send a first UE capability information message to the access network device, where the first UE capability information message carries the second band combination and does not carry the second multi-RAT band combination. A second UE capability enquiry request message carries the second UE capability enquiry request information and the multi-RAT request condition and does not carry the first UE capability enquiry request information. In response to the second UE capability enquiry request message, the UE may send a second UE capability information message to the access network device, where the second UE capability information message carries the second multi-RAT band combination and does not carry the second band combination.

Alternatively, for example, a first UE capability enquiry request message carries first UE capability enquiry request information and the multi-RAT request condition and does not carry second UE capability enquiry request information. In response to the first UE capability enquiry request message, the UE may send a first UE capability information message to the access network device, where the first UE capability information message carries the first CA band combination and does not carry the second multi-RAT band combination or a band combination other than the first CA band combination in the second band combination; and then the UE sends a second UE capability information message to the access network device, where the second UE capability information message carries the band combination other than the first CA band combination in the second band combination and does not carry the first CA band combination or the second multi-RAT band combination. A second UE capability enquiry request message carries the second UE capability enquiry request information and the multi-RAT request condition and does not carry the first UE capability enquiry request information. In response to the second UE capability enquiry request message, the UE may send a third UE capability information message to the access network device, where the third UE capability information message carries the second multi-RAT band combination and does not carry the second band combination.

In a possible implementation, the first band combination may further include a non-CA band combination. Because the UE cannot report all band combinations in the first band combination, some band combinations in the first band combination cannot be reported. As specified in a protocol, a reporting priority of a non-CA band combination is higher than a reporting priority of a CA band combination. That is, compared with a CA band combination, the UE preferentially reports a non-CA band combination.

In this embodiment, that the UE preferentially reports the first CA band combination may be understood as that the first CA band combination has a relatively high reporting priority in the first band combination, but does not mean that the first CA band combination has a highest reporting priority in the first band combination. For example, a reporting priority of the non-CA band combination in the first band combination may be higher than the reporting priority of the first CA band combination.

A higher reporting priority of a band combination may be considered as a higher possibility or probability of reporting the band combination. An implementation may be, for example, a higher order in which the band combination is written into a UE capability information message, or for example, the band combination being sent to the access network device before a band combination with a lower reporting priority.

According to the protocol, a reporting priority of 2CC is higher than a reporting priority of another aggregation type (such as 3CC). Therefore, in a possible implementation, "a priority of reporting the first CA band combination is higher than a priority of reporting a second CA band combination in the first band combination" may be: A priority of reporting the first CA band combination is higher than a priority of reporting a second CA band combination whose quantity of carriers is the same as a quantity of carriers of the first CA band combination, that is, a quantity of carriers included in the first CA band combination is the same as a quantity of carriers included in the second CA band combination. Alternatively, in a possible implementation, "a priority of reporting the first CA band combination is higher than a priority of reporting a second CA band combination in the first band combination" may be: The first CA band combination is a CA band combination that is in the first band combination and that meets the multi-RAT request condition and includes two carriers.

It should be noted that the second band combination is a band combination that is reported by the UE and supported in the first RAT. In consideration of reduction of uplink overheads, the second band combination is generally some (but not all) band combinations supported by the UE in the first RAT. Similarly, the second multi-RAT band combination is a multi-RAT band combination that is reported by the UE and supported by the UE in the first RAT and the second RAT and that meets the multi-RAT request condition. In consideration of reduction of uplink overheads, the second multi-RAT band combination is some (but not all) multi-RAT band combinations that are supported by the UE in the first RAT and the second RAT and that meet the multi-RAT request condition.

In a possible implementation, the multi-RAT request condition may include one or more sub-conditions.

In a possible implementation, all sub-conditions are used to define both a condition that needs to be met by a band combination in the first RAT in the second multi-RAT band combination and a condition that needs to be met by a band combination in the second RAT in the second multi-RAT band combination. For example, one sub-condition in the multi-RAT request condition may be bandwidth of a carrier.

Alternatively, in a possible implementation, there is such a sub-condition (referred to as a first request condition) in the multi-RAT request condition, and the first request condition is used only to define a condition that needs to be met by a band combination in the first RAT in the second multi-RAT band combination. In this case, that the first CA band combination meets the multi-RAT request condition may mean that the first CA band combination meets the first request condition in the multi-RAT request condition. That the second multi-RAT band combination meets the multi-RAT request condition may include: The band combination in the first RAT in the second multi-RAT band combination meets the first request condition in the multi-RAT request condition.

In a possible implementation, the first request condition in the multi-RAT request condition may include at least one of the following: a quantity of carriers aggregated in the first RAT, maximum carrier bandwidth supported in the first RAT, a band supported in the first RAT, intra-band contiguous CA supported in the first RAT, intra-band non-contiguous CA supported in the first RAT, a combination of inter-band CA supported in the first RAT and intra-band contiguous CA supported in the first RAT, and a combination of inter-band CA supported in the first RAT and intra-band non-contiguous CA supported in the first RAT.

In a possible implementation, the first request condition in the multi-RAT request condition includes: supporting a first band in the first RAT, where the first band may be one or more bands. In this case, that the first CA band combination meets the first request condition may include: All carriers in the first CA band combination are located in the first band. For example, the first band is a band 3. In this case, the first request condition is used to define a condition that all carriers in the band combination in the first RAT in the second multi-RAT band combination should be located in the band 3, and all carriers in the first CA band combination are located in the band 3.

Alternatively, in a possible implementation, the first request condition in the multi-RAT request condition includes: A quantity of carriers aggregated in the first RAT is a first quantity. In this case, that the first CA band combination meets the first request condition may include: A quantity of carriers in the first CA band combination does not exceed the first quantity, or a quantity of carriers in the first CA band combination is the first quantity.

Alternatively, in a possible implementation, the first request condition in the multi-RAT request condition includes: supporting a first band in the first RAT and contiguous CA in the first band. In this case, that the first CA band combination meets the first request condition may include: A plurality of carriers in the first CA band combination are contiguous carriers located in the first band.

In a possible implementation, all band combinations in the first RAT in the second multi-RAT band combination are included in first CA band combination of the CA. In this way, after the access network device configures the UE to be in the multi-RAT multi-connectivity mode based on the second multi-RAT band combination reported by the UE, in a process of deleting the SCG, the access network device may configure, based on the first CA band combination reported by the UE, the UE to roll back to the CA mode, thereby improving the network bandwidth of the UE.

In a possible implementation, reporting the second multi-RAT band combination in the first multi-RAT band combination may include: preferentially reporting a third multi-RAT band combination in the first multi-RAT band combination, where the third multi-RAT band combination is a multi-RAT band combination that is supported by the UE in the first RAT and the second RAT and that meets the multi-RAT request condition, and a band combination in the first RAT in the third multi-RAT band combination is included in the first CA band combination. In this way, a possibility that the access network device configures the UE to be in the multi-RAT multi-connectivity mode based on the third multi-RAT band combination is improved, thereby improving a possibility that the access network device configures, when deleting the SCG and based on the first CA band combination reported by the UE, the UE to roll back to the CA mode. This helps improve the network bandwidth of the UE.

In a possible implementation, the multi-connectivity mode of the first RAT and the second RAT is a multi-RAT dual connectivity MRDC mode technology of the first RAT and the second RAT.

In a possible implementation, the multi-RAT band combination in the first RAT and the second RAT is an MRDC band combination in the first RAT and the second RAT.

In a possible implementation, the first RAT is evolved universal terrestrial radio access (E-UTRA), and the second RAT is 5th generation new radio (NR). Alternatively, the first RAT is NR, and the second RAT is E-UTRA.

A second aspect provides a UE capability reporting apparatus, including: a receiving module, configured to receive first capability enquiry request information, second capability enquiry request information, and a multi-RAT request condition, where the first capability enquiry request information is used to indicate UE to report a first band combination supported by the UE in a first radio access technology RAT, and the second capability enquiry request information and the multi-RAT request condition are used to indicate the UE to report a first multi-RAT band combination that is supported by the UE in the first RAT and a second RAT and that meets the multi-RAT request condition; a first reporting module, configured to preferentially report a first carrier aggregation CA band combination in the first band combination based on the first capability enquiry request information and the multi-RAT request condition, where a priority of reporting the first CA band combination is higher than a priority of reporting a second CA band combination in the first band combination, the second CA band combination does not meet the multi-RAT request condition, and the first CA band combination meets the multi-RAT request condition; and a second reporting module, configured to report a second multi-RAT band combination in the first multi-RAT band combination based on the second capability enquiry request information and the multi-RAT request condition, where the second multi-RAT band combination is used to configure the UE to be in a multi-connectivity mode of the first RAT and the second RAT.

In a possible implementation, that the first CA band combination meets the multi-RAT request condition includes: The first CA band combination meets a first request condition in the multi-RAT request condition, where the first request condition is a condition that needs to be met by a band combination in the first RAT in the second multi-RAT band combination.

In a possible implementation, the first request condition includes at least one of the following: a quantity of carriers aggregated in the first RAT, maximum carrier bandwidth supported in the first RAT, a band supported in the first RAT, intra-band contiguous CA supported in the first RAT, intra-band non-contiguous CA supported in the first RAT, a combination of inter-band CA supported in the first RAT and intra-band contiguous CA supported in the first RAT, and a combination of inter-band CA supported in the first RAT and intra-band non-contiguous CA supported in the first RAT.

In a possible implementation, the first request condition includes: supporting a first band in the first RAT. That the first CA band combination meets the first request condition includes: All carriers in the first CA band combination are located in the first band.

In a possible implementation, all band combinations in the first RAT in the second multi-RAT band combination are included in the first CA band combination.

In a possible implementation, the second reporting module is configured to preferentially report a third multi-RAT band combination in the first multi-RAT band combination, where a band combination in the first RAT in the third multi-RAT band combination is included in the first CA band combination.

In a possible implementation, the multi-connectivity mode of the first RAT and the second RAT is a multi-RAT dual connectivity MRDC mode of the first RAT and the second RAT.

In a possible implementation, the first RAT is evolved universal terrestrial radio access E-UTRA, and the second RAT is 5th generation new radio NR. Alternatively, the first RAT is NR, and the second RAT is E-UTRA.

In a possible implementation, the first CA band combination includes two carriers.

The UE capability reporting apparatus provided in the second aspect may be a computer device or may be a chip in a computer device. The UE capability reporting apparatus provided in the second aspect has a function of implementing embodiments of the first aspect. The function may be implemented by hardware or may be implemented by hardware executing corresponding software. The hardware or the software includes one or more units corresponding to the foregoing function.

The UE capability reporting apparatus may be implemented in a form of a computer device.

A third aspect provides a computer device. The computer device includes a processor and a memory. When running computer instructions stored in the memory, the processor performs the method in any one of the first aspect or the possible implementations of the first aspect.

The UE capability reporting apparatus may be implemented in a form of a chip.

A fourth aspect provides a chip. The chip includes a processor and a communication interface, the communication interface is coupled to the processor, and the processor is configured to run a computer program or instructions, to implement the method in any one of the first aspect or the possible implementations of the first aspect.

For example, the communication interface (or referred to as an interface circuit) may be an input/output interface, a pin, a circuit, or the like. The processor may execute computer instructions stored in a memory, so that the chip of a computer device performs the method in any one of the first aspect or the possible implementations of the first aspect.

Optionally, the memory is a storage unit in the chip, such as a register or a cache; or the memory may be a memory that is in the computer device and that is located outside the chip, such as a read-only memory (ROM), another type of static storage device that may store static information and instructions, or a random access memory (RAM).

The chip may be a baseband chip or a system-on-a-chip (SoC) or include a baseband chip and a SoC.

Any processor mentioned above may be a baseband processor or may be a general-purpose central processing unit (CPU). The baseband processor and the CPU may be integrated or separated.

A fifth aspect provides a computer-readable storage medium. The computer-readable storage medium includes instructions. When the instructions are run on a computer, the computer is enabled to perform the method in any one of the first aspect or the possible implementations of the first aspect.

A sixth aspect provides a computer program product. The computer program product includes instructions. When the instructions are run on a computer, the computer is enabled to perform the method in the possible implementations of the first aspect.

A seventh aspect provides a user equipment UE capability reporting system. The UE capability reporting system includes an access network device and UE communicating with the access network device. The UE is configured to perform the method in the possible implementations of the first aspect.

The apparatuses provided in the embodiments may be configured to perform the method in the foregoing corresponding embodiment. Therefore, for effects that can be obtained by the apparatus embodiments, refer to the foregoing corresponding method embodiment. Details are not described herein.

DETAILED DESCRIPTION OF THE EMBODIMENTS

The embodiments may be applied to various wireless communication systems or networks, for example, a global system for mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, and a future 5th generation (5G) system.

Although the embodiments are generally described by using terms associated with 4th generation (4G) and/or 5G wireless technologies, the embodiments may also be applied to communication systems based on other generations (for example, after 5G). Various concepts provided throughout the embodiments may be implemented in various telecommunication systems, network architectures, and communication standards.

Figure 1:
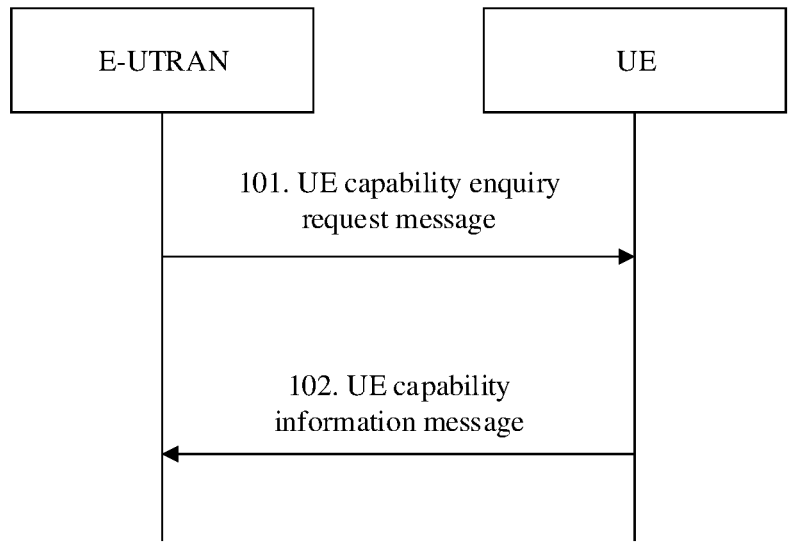
FIG. 1 is a schematic diagram of a UE capability transfer procedure.
Figure 2:
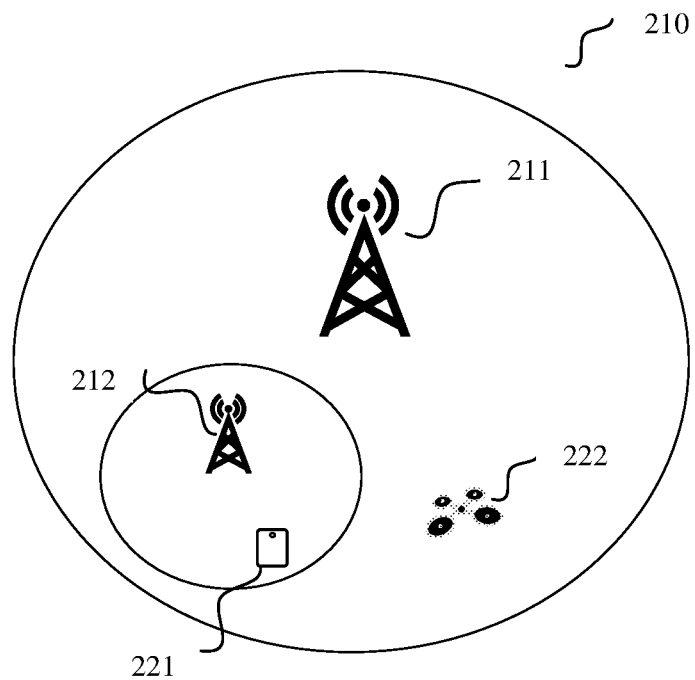
FIG. 2 is a schematic diagram of an access network.

By way of example but not limitation, FIG. 2 provides a schematic diagram of an access network 210 of a wireless communication system.

The access network 210 may include a plurality of access network devices. The access network device may be, for example, an access node and/or another network entity (for example, although not shown, the access network 210 may include a centralized unit (CU) and a distributed unit (DU)). In the embodiments, the access node may be a base transceiver station (BTS) in a GSM or CDMA system, may be a NodeB (NB) in a WCDMA system, may be an evolved NodeB (eNB) in an LTE system, or may be a radio controller in a cloud radio access network (CRAN) scenario. Alternatively, the base station may be a relay station, an access point, a vehicle-mounted device, a wearable device, a base station in a future 5G network, a base station in a future evolved PLMN network, or the like, for example, a next generation NodeB (gNB). This is not limited in the embodiments.

The access network 210 may be a network of one RAT, or in a possible implementation, the access network 210 may include networks of two or more RATs. Accordingly, the access network 210 includes access nodes of two or more RATs. FIG. 2 uses an example in which the access network 210 includes one eNB 211 and one gNB 212.

An access node (for example, a base station) may provide wireless cell signal coverage and serve as one or more cells for UE. A cell may be geographically defined (for example, by using a coverage area), and/or may be defined based on a frequency, a scrambling code, or the like. In FIG. 2, a circular area with the eNB 211 as a center represents a coverage area of a cell of the eNB 211, and a circular area with the gNB 212 as a center represents a coverage area of a cell of the gNB 212.

In a coverage area of the access network 210, there may be UE that communicates with the access network 210. For example, UE 221 may communicate with the eNB 211 and the gNB 212, and UE 222 may communicate with the eNB 211.

The UE in the embodiments may be a subscriber unit, a subscriber station, a mobile station, a mobile console, a remote station, a remote terminal, a mobile device, a user terminal, a terminal, a wireless communication device, a user agent, or a user apparatus. The UE may alternatively be a cellular phone, a cordless phone, a Session Initiation Protocol (SIP) phone, a wireless local loop (WLL) station, a personal digital assistant (PDA), a handheld device that has a wireless communication function, a computing device, another processing device connected to a wireless modem, a vehicle-mounted device, a wearable device, a terminal in a future 5G network, a terminal in a future evolved public land mobile network (PLMN), or the like. This is not limited in the embodiments.

With rapid development of mobile Internet, a requirement for bandwidth of a wireless network that provides a data channel for the UE is increasingly higher. A carrier aggregation (CA) technology and a multi-connectivity (including dual connectivity) technology emerge as the times require.

For ease of understanding, some terms in the embodiments are first briefly described.

Band: Generally, the band is a frequency range. For example, in a communication protocol, for reference by a network operator and a device vendor, spectrum resources are divided into a plurality of ranges based on an actual situation of spectrum resources in each country, and each range corresponds to a number and is used as a band. For example, an actual physical spectrum range of a band 38 is 2570 MHz to 2620 MHz, and a physical spectrum range of a band 40 is 2300 MHz to 2400 MHz.

Carrier: A carrier allocated to the UE is a communication frequency resource that may be used for signal transmission. The carrier may occupy some bandwidth and is located in a band. Using an LTE system as an example, maximum carrier bandwidth of LTE is 20 MHz, which may be further divided into 1.4 MHz, 3 MHz, 5 MHz, or 10 MHz. For example, a UE camps on a cell whose cell ID is 0, and the cell corresponds to a carrier whose band is the band 38, center frequency is 2585 MHz, and bandwidth is 20 MHz.

Figure 3:
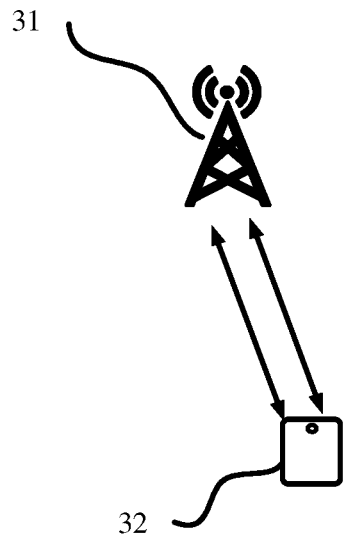
FIG. 3 is a schematic diagram of a CA scenario according to an embodiment.

FIG. 3 shows a CA scenario according to an embodiment. CA means that two or more carriers, or referred to as component carriers (CC), are aggregated to transmit data, to implement higher transmission bandwidth between an access node and UE. The UE may determine, based on a capability of the UE, a maximum quantity of carriers that may be simultaneously used to perform uplink and downlink transmission. In FIG. 3, an example in which two CCs are aggregated to transmit data between a base station 31 and UE 32 is used. A CA function can be used to support contiguous or non-contiguous carrier aggregation and support intra-band or inter-band carrier aggregation. The UE may use CA to perform data transmission with a single base station in the multi-connectivity scenario. Alternatively, the UE may use carrier aggregation to perform data transmission with a plurality of base stations.

Figure 4:
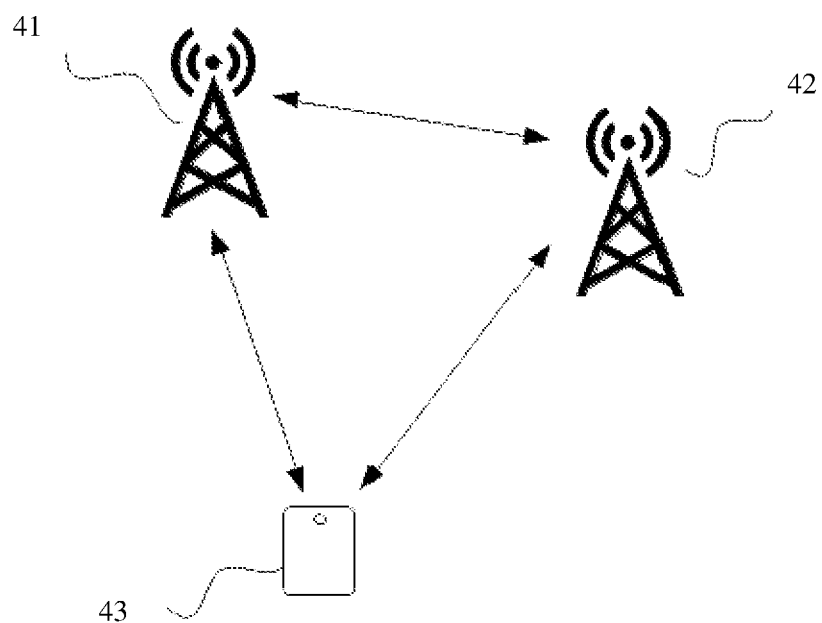
FIG. 4 is a schematic diagram of a multi-connectivity scenario according to an embodiment.

A dual-connectivity scenario is used as an example in FIG. 4. Multi-connectivity may improve throughput performance by aggregating radio resources of different base stations. Generally, the multi-connectivity scenario may include one master base station and at least one secondary base station. The master base station and the secondary base station may be connected by using a communication interface. In the multi-connectivity scenario, the master base station (a base station 41 is used as an example in FIG. 4) and the secondary base station (a base station 42 is used as an example in FIG. 4) may jointly serve UE (UE 43 is used as an example in FIG. 4). In other words, for a same session established between the UE and a core network, the master base station and the secondary base station may simultaneously perform data transmission with the UE. In a possible scenario, the master base station may be responsible for a control plane signaling procedure and user plane data transmission between the master base station and the UE, and the secondary base station only needs to be responsible for user plane data transmission between the secondary base station and the UE. That is, the master base station may establish a data resource bearer (DRB) and a signaling resource bearer (SRB) between the master base station and the UE, and the secondary base station only needs to establish a DRB between the secondary base station and the UE. Alternatively, in another possible scenario, either of the master base station and the secondary base station may be responsible for control plane transmission and user plane data transmission with the UE. That is, the master base station may establish a DRB and an SRB between the master base station and the UE, and the secondary base station may also establish a DRB and an SRB between the secondary base station and the UE.

Generally, multi-connectivity in which the master base station and the secondary base station belong to base stations of different RAT types is referred to as multi-RAT multi-connectivity. For example, the master base station 41 in FIG. 4 may correspond to the eNB 211 in the access network 210 shown in FIG. 2, and the secondary base station 42 in FIG. 4 may correspond to the gNB 212 in the access network 210 shown in FIG. 2.

When the UE performs multi-RAT multi-connectivity, a CA technology may be further used in each RAT. For example, when the UE performs dual connectivity between E-UTRA and NR, 3CA is performed in E-UTRA, and 2CA is performed in NR.

Embodiments may provide a technology that helps implement communication in an access network supporting different RATs (for example, LTE and NR).

By way of example, it is assumed that the UE 221 and the eNB 211 are configured to support CA and support dual connectivity between E-UTRA and NR (ENDC), and the gNB 212 is configured to support ENDC.

After the UE accesses a wireless communication network, for example, after the UE 221 accesses the access network 210, the access network 210 requires the UE 221 to report UE capability information. An access network device (for example, the eNB 211) in the access network 210 may send a UE capability enquiry request message (for example, a UECapabilityEnquiry message) to the UE 221 in a coverage area of the access network device, to indicate the UE 221 to report the UE capability information of the UE 221. After receiving the UE capability enquiry request message, the UE 221 may send a UE capability information message (for example, a UECapabilityInformation message) to the access network device (for example, the eNB 211) in the access network 210. Because the UE 221 supports CA and ENDC, the UE capability information message generally includes a band combination supported by the UE in E-UTRA and a multi-RAT band combination (or referred to as an MRDC band combination) supported by the UE in E-UTRA and NR. The band combination supported by the UE in E-UTRA includes a CA band combination, and generally further includes a non-CA band combination.

The CA band combination may refer to a combination manner of a band and carrier aggregation. In other words, the CA band combination may be used to indicate a CA configuration (carrier aggregation configuration) corresponding to at least one band. The CA configuration may refer to a combination of a CA operating band(s) and a CA bandwidth class(es). The CA operating band may be one or more operating bands used for carrier aggregation. The CA bandwidth class may be a class defined by an aggregated transmission bandwidth configuration and a maximum quantity of carriers for the one or more operating bands. The CA configuration may be further used to indicate another type of configuration information, for example, configuration information such as supporting intra-band contiguous CA or intra-band non-contiguous CA.

In some examples, the CA band combination may be used to indicate at least one of the following: a quantity of aggregated carriers, supported maximum carrier bandwidth, a band or a band combination manner, intra-band contiguous CA, intra-band non-contiguous CA, or inter-band CA. The supported maximum carrier bandwidth may be maximum bandwidth of supported aggregated carriers. Further, based on different support capabilities of the UE or different network specifications, inter-band CA may be further classified into different scenarios, such as crossing two bands, crossing three bands, or crossing four bands. When a quantity of supported CCs is greater than 3, a combination of inter-band CA and intra-band contiguous CA, and a combination of inter-band CA and intra-band non-contiguous CA are further included. For example, inter-band CA of three carriers in a band 1 and a band 3 may be supported, and contiguous CA of two carriers in the band 1 may be supported. Alternatively, inter-band CA of three carriers in a band 1 and a band 3 is supported, and non-contiguous CA of two carriers in the band 1 is supported.

A type of a CA band combination supported by the UE may vary according to a type of the UE. Generally, the UE can support CA band combinations supported by a plurality of operators or countries. In addition, more bands supported by the UE lead to more types of CA band combinations that may be supported by the UE. Therefore, a quantity of CA band combinations and multi-RAT band combinations supported by the UE is generally relatively large. For example, it is assumed that the UE supports a band 1, a band 2, a band 3, a band 4, a band 5, a band 7, a band 8, a band 12, a band 17, a band 20, a band 38, a band 39, a band 40, and a band 41, and various CA band combinations within and across these bands. According to table lookup, the UE may support more than 210 CA band combinations.

In an example, for two complete bands, namely, the band 1 (downlink 2110 MHz to 2170 MHz) and the band 3 (downlink 1805 MHz to 1880 MHz), CA band combinations allowed by a protocol may include types indicated by the following indexes:

CA_1C: a maximum of 40 MHz bandwidth, two carriers, and contiguous CA in the band 1;

CA_1A-1A: a maximum of 40 MHz bandwidth, two carriers, and non-contiguous CA in the band 1;

CA_3B: a maximum of 10 MHz bandwidth, and contiguous CA in the band 3; CA_3C: a maximum of 40 MHz bandwidth, two carriers, and contiguous CA in the band 3;

CA_3A-3A: a maximum of 40 MHz bandwidth, two carriers, and non-contiguous CA in the band 3;

CA_1A-3A: a maximum of 40 MHz bandwidth, two carriers, and inter-band CA of the band 1 and the band 3;

CA_1A-1A-3A: a maximum of 60 MHz bandwidth, three carriers, and inter-band CA of the band 1 and the band 3, where two carriers are non-contiguous in the band 1;

CA_1A-3A-3A: a maximum of 60 MHz bandwidth, three carriers, and inter-band CA of the band 1 and the band 3, where two carriers are non-contiguous in the band 3;

CA_1A-3C: a maximum of 60 MHz bandwidth, three carriers, and inter-band CA of the band 1 and the band 3, where two carriers are contiguous in the band 3; and CA_1A-1A-3C: a maximum of 80 MHz bandwidth, four carriers, and inter-band CA of the band 1 and the band 3, where two carriers are non-contiguous in the band 1, and two carriers are contiguous in the band 3.

In some examples, it may be considered that a multi-RAT band combination of E-UTRA and NR includes a band combination of E-UTRA and a band combination of NR. A multi-RAT band combination MRDC_1A-3A-78A of E-UTRA and NR is used as an example. The multi-RAT band combination includes one carrier in the band 1, one carrier in the band 3, and one carrier in a band 78. Inter-band CA of the band 1 and the band 3 is performed, and multi-RAT dual connectivity is configured between E-UTRA (the band 1 and the band 3) and NR (band 78). A band combination in a first RAT in the multi-RAT band combination is a CA band combination, which is CA_1A-3A.

Generally, a band allowed to operate by a network operator is authorized by a country in which the operator is located. Generally, an operator owns only a few bands, and may own only some bandwidth of a band rather than the entire band. For example, an operator owns only four bands: the band 38, the band 39, the band 40, and the band 41. In addition, the operator may selectively own only some bandwidth in the four bands. Correspondingly, CA band combinations supported by the operator are also limited to only CA band combinations corresponding to the four bands.

According to the foregoing analysis, when the UE reports a band combination that is not supported by the operator, uplink resources are wasted. In addition, to avoid a failure of a base station to parse UE capability information due to an excessively large volume of the UE capability information, the following measures are generally used: On one hand, a maximum quantity of band combinations reported by the UE is limited, to avoid an excessive information amount of the UE capability information; on the other hand, the UE capability enquiry request message sent by the access network device generally carries a UE capability request condition. For example, an E-UTRA request condition (for example, requestedFrequencyBands) is used to obtain, through filtering, a band combination that is reported by the UE and supported in E-UTRA. For example, an MRDC band combination request condition (or referred to as a multi-RAT request condition, for example, requestedFreqBandsNR-MRDC) is used to obtain, through filtering, an MRDC band combination that is reported by the UE and supported in E-UTRA and NR.

By way of example, it is assumed that CA band combinations supported by the UE 221 include CA_1A-3A, CA_1A-4A, CA_1A-5A, CA_3A-4A, and CA_3A-4C, and MRDC band combinations of E-UTRA and NR supported by the UE 221 include MRDC_1A-3A-78A, MRDC_1A-4A-77A, MRDC_3A-7A-78A, and MRDC_1A-7A-78A. A band 77 and the band 78 are bands in NR. It is assumed that a multi-RAT request condition carried in the UE capability enquiry request message sent by the eNB 211 to the UE 221 is: The band 1, the band 3, the band 7, and the band 78 are supported, a maximum quantity of E-UTRA band combinations that are allowed to be reported by the UE is 2, and a maximum quantity of MRDC band combinations that are allowed to be reported by the UE is 2.

In response to the UE capability enquiry request message, the UE may report two supported CA band combinations to the eNB 211. As specified in the protocol, in a process of reporting a CA band combination by the UE, a priority of a CA band combination of two carriers aggregated (or referred to as 2CC) is higher than another type of CA band combination, for example, a CA band combination of three carriers aggregated (or referred to as 3CC). In a conventional technology, after the UE 221 receives the UE capability enquiry request message, the CA band combinations reported by the UE 221 may be any two CA band combinations of CA_1A-3A, CA_1A-4A, CA_1A-5A, and CA_3A-4A. In the conventional technology, because the band combinations reported by the UE 221 do not reference the multi-RAT request condition, a possibility that the UE 221 reports a band combination (for example, CA_1A-3A) that meets the multi-RAT request condition is relatively low. It is assumed that the band combinations reported by the UE 221 are CA_1A-4A and CA_1A-5A.

In response to the UE capability enquiry request message, the UE may report two supported MRDC band combinations to the eNB 211. The UE 221 may report, to the eNB 211, two MRDC band combinations that are supported in E-UTRA and NR and that meet the multi-RAT request condition, that is, any two of MRDC_1A-3A-78A, MRDC_1A-7A-78A, and MRDC_3A-7A-78A, for example, MRDC_1A-3A-78A and MRDC_1A-7A-78A.

After the UE 221 enters the coverage area of the cell (for example, a cell operating in N78) of the gNB 212, the access network device in the access network 210 may add an SCG (a cell operating in N78) for the UE 221 based on an MRDC band combination (for example, MRDC_1A-3A-78A) reported by the UE 221, configure carrier aggregation for the UE 221 based on CA_1A-3A, and configure the UE 221 to be in an ENDC mode. When the eNB 211 configures the UE 221 to switch from the ENDC mode to an E-UTRA mode, for example, when the UE 221 leaves the coverage area of the cell of the gNB 212, the eNB 211 may delete the SCG, and because the UE 221 does not report CA_1A-3A, the eNB 211 cannot configure the UE 221 to roll back to a CA mode corresponding to CA_1A-3A. This is not conducive for the UE 221 to continue to enjoy a high-bandwidth service, thereby reducing user experience.

It is assumed that when the access network device configures the UE to be in a multi-RAT multi-connectivity mode of a first RAT and a second RAT, an MCG belongs to the first RAT, an SCG belongs to the second RAT, and a multi-RAT band combination selected by the access network device from multi-RAT band combinations reported by the UE is a fourth multi-RAT band combination. It is found by studying the foregoing scenario that, in a procedure in which the access network device deletes the SCG, a key to a capability of the UE to be configured to roll back to a CA mode of the first RAT is: In a process of reporting a band combination supported in the first RAT, the UE reports a band combination in the first RAT in the fourth multi-RAT band combination.

To improve a possibility that the UE is configured to roll back to the CA mode of the first RAT in the procedure in which the access network device deletes the SCG, an embodiment provides a UE capability reporting method, to improve a possibility that the UE reports a CA band combination in the first RAT in the fourth multi-RAT band combination.

Figure 5:
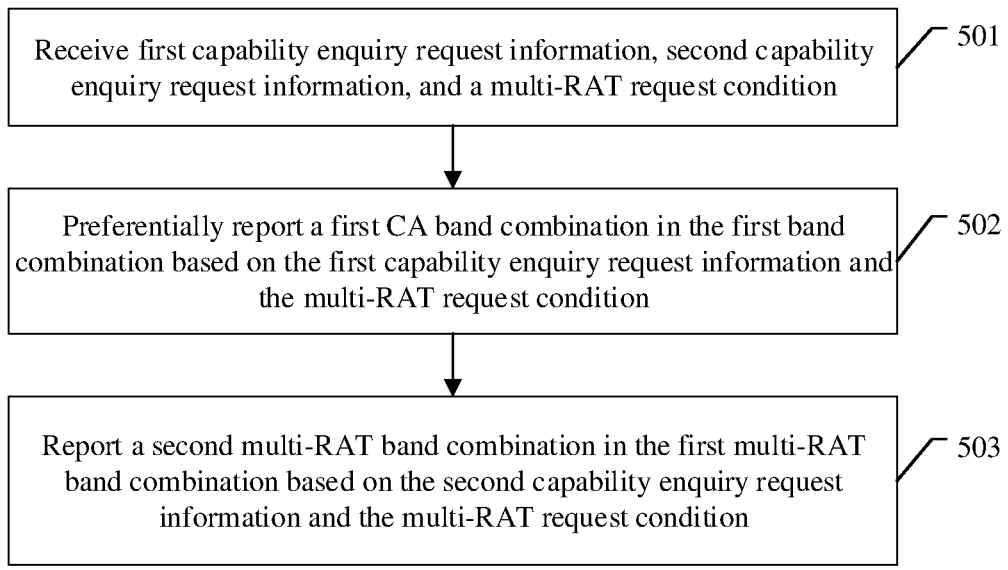
FIG. 5 is a schematic diagram of an embodiment of a UE capability reporting method.

As shown in FIG. 5, an embodiment of the UE capability reporting method may include the following steps:

501. Receive first capability enquiry request information, second capability enquiry request information, and a multi-RAT request condition.

UE may receive the first capability enquiry request information, the second capability enquiry request information, and the multi-RAT request condition. For example, after an access network device sends a UE capability enquiry request message to the UE, the UE may receive the UE capability enquiry request message. The UE capability enquiry request message may include the first capability enquiry request information, the second capability enquiry request information, and the multi-RAT request condition.

The first capability enquiry request information is used to indicate the UE to report one or more band combinations supported by the UE in a first RAT, and the one or more band combinations supported by the UE in the first RAT are referred to as a first band combination. The second capability enquiry request information and the multi-RAT request condition are used to indicate the UE to report a first multi-RAT band combination that is supported by the UE in the first RAT and a second RAT and that meets the multi-RAT request condition. That is, the first multi-RAT band combination is a multi-RAT band combination that is supported by the UE in the first RAT and the second RAT and that meets the multi-RAT request condition. For example, the second capability enquiry request information is used to request the UE to report one or more multi-RAT band combinations supported by the UE in the first RAT and the second RAT. The multi-RAT request condition is used to indicate a condition that needs to be met by a multi-RAT band combination reported by the UE, to filter out, from the supported multi-RAT band combination, a multi-RAT band combination that does not meet the multi-RAT request condition.

502. Preferentially report a first CA band combination in the first band combination based on the first capability enquiry request information and the multi-RAT request condition.

In a conventional technology, the UE does not reference the multi-RAT request condition in a process of reporting the first band combination. However, in this embodiment, if the UE supports CA in the first RAT, after the UE receives the first capability enquiry request information and the multi-RAT request condition, because the UE capability enquiry request message includes the first capability enquiry request information and the multi-RAT request condition, the UE may preferentially report the first CA band combination that meets the multi-RAT request condition, and the first CA band combination may be used to configure the UE to be in a CA mode of the first RAT. A priority of reporting the first CA band combination may be higher than a priority of reporting a second CA band combination in the first band combination, the second CA band combination does not meet the multi-RAT request condition, and the first CA band combination meets the multi-RAT request condition.

503. Report a second multi-RAT band combination in the first multi-RAT band combination based on the second capability enquiry request information and the multi-RAT request condition.

If the UE supports multi-RAT multi-connectivity between the first RAT and the second RAT, after the UE receives the second capability enquiry request information and the multi-RAT request condition, the UE may report one or more multi-RAT band combinations in the first multi-RAT band combination. The multi-RAT band combination reported by the UE is referred to as the second multi-RAT band combination. The second multi-RAT band combination is used to configure the UE to be in a multi-RAT multi-connectivity mode of the first RAT and the second RAT.

It is assumed that the access network device configures the UE to be in the multi-RAT multi-connectivity mode of the first RAT and the second RAT based on a fourth multi-RAT band combination in the second multi-RAT band combination, where a RAT type of an MCG is the first RAT, and a RAT type of an SCG is the second RAT. A band combination in the first RAT in the fourth multi-RAT band combination is a CA band combination (referred to as a component CA band combination). In this case, in a procedure in which the access network device deletes the SCG, if a second band combination reported by the UE includes the component CA band combination, the access network device may configure, based on the component CA band combination, the UE to roll back to the CA mode. Both the component CA band combination and the first CA band combination preferentially reported by the UE meet the multi-RAT request condition. Therefore, compared with another band combination in the first band combination, a CA band combination in the first CA band combination is more likely to be the same as the component CA band combination. It may be understood that, in the method provided in this embodiment, the UE preferentially reports the first CA band combination, to help improve a possibility that the second band combination (that is, a band combination that is in the first RAT and that is reported by the UE) includes the component CA band combination, thereby helping improve a possibility that the UE is configured to roll back to the CA mode of the first RAT, improve network bandwidth of the UE, and improve user experience of the UE.

It is assumed that the multi-RAT request condition includes a first request condition, and the first request condition is a condition that needs to be met by a band combination in the first RAT in the second multi-RAT band combination. In a possible implementation, that the first CA band combination meets the multi-RAT request condition may include: The first CA band combination meets the first request condition in the multi-RAT request condition.

In a possible implementation, the first request condition for the first RAT in the multi-RAT request condition includes at least one of the following: a quantity of carriers aggregated in the first RAT, maximum carrier bandwidth supported in the first RAT, a band supported in the first RAT, intra-band contiguous CA supported in the first RAT, intra-band non-contiguous CA supported in the first RAT, a combination of inter-band CA supported in the first RAT and intra-band contiguous CA supported in the first RAT, and a combination of inter-band CA supported in the first RAT and intra-band non-contiguous CA supported in the first RAT.

In a possible implementation, the first request condition includes: supporting a first band in the first RAT, where the first band may be one or more bands. In this case, that the first CA band combination meets the first request condition may include: All carriers in the first CA band combination are located in the first band.

For example, it is assumed that band combinations supported by the UE in E-UTRA include CA_1A-3A, CA_1A-3A-7A, CA_1A-4A, CA_1A-5A, CA_3A-4A, and CA_3A-4C; the multi-RAT request condition is supporting some or all bands of a band 1, a band 3, a band 7, and a band 78; the first request condition in the multi-RAT request condition is supporting some or all bands of the band 1, the band 3, and the band 7; and the first CA band combination includes CA_1A-3A and CA_1A-3A-7A. Compared with another CA band combination, the first CA band combination has a higher reporting priority. It is assumed that a quantity of band combinations that are supported in E-UTRA and reported by the UE does not exceed 3. In this case, the band combinations that are supported in E-UTRA and reported by the UE necessarily include CA_1A-3A and CA_1A-3A-7A and may further include one CA band combination of CA_1A-4A, CA_1A-5A, CA_3A-4A, and CA_3A-4C.

It should be noted that, that the first CA band combination is preferentially reported does not mean that a reporting priority of the first CA band combination is higher than a reporting priority of any other band combination supported by the UE. For example, according to a protocol, a reporting priority of 2CC is higher than a reporting priority of another aggregation type (such as 3CC). Therefore, in a possible implementation, "a priority of reporting the first CA band combination is higher than a priority of reporting a second CA band combination in the first band combination" may be: A priority of reporting the first CA band combination is higher than a priority of reporting a second CA band combination whose quantity of carriers is the same as a quantity of carriers of the first CA band combination, that is, a quantity of carriers included in the first CA band combination is the same as a quantity of carriers included in the second CA band combination. Alternatively, in a possible implementation, "a priority of reporting the first CA band combination is higher than a priority of reporting a second CA band combination in the first band combination" may be: The first CA band combination is a CA band combination that is in the first band combination and that meets the multi-RAT request condition and includes two carriers.

For example, it is still assumed that CA band combinations supported by the UE include CA_1A-3A, CA_1A-3A-7A, CA_1A-4A, CA_1A-5A, CA_3A-4A, and CA_3A-4C. In this case, a reporting priority of a 2CC band combination is higher than a reporting priority of a 3CC band combination. That is, reporting priorities of CA_1A-3A, CA_1A-4A, CA_1A-5A, and CA_3A-4A are higher than reporting priorities of CA_1A-3A-7A and CA_3A-4C. In addition, in the 2CC band combinations, a reporting priority of CA_1A-3A is higher than reporting priorities of CA_1A-4A, CA_1A-5A, and CA_3A-4A. In the 3CC band combinations, a reporting priority of CA_1A-3A-7A is higher than a reporting priority of CA_3A-4C. If a quantity of CA band combinations in the CA first CA band combination reported by the UE cannot exceed 3, the CA first CA band combination reported by the UE necessarily includes CA_1A-3A and may further include two band combinations of CA_1A-4A, CA_1A-5A, and CA_3A-4A.

To further improve the possibility that the UE is configured to roll back to the CA mode of the first RAT in a procedure in which the access network device deletes the SCG, in step 503, the UE may report the multi-RAT band combination based on the reported first CA band combination, to improve a probability that the band combination reported by the UE includes the band combination in the first RAT in the fourth multi-RAT band combination. The fourth multi-RAT band combination is a band combination selected from the multi-RAT band combination reported by the UE, when the access network device configures the UE to be in the multi-RAT multi-connectivity mode.

In a possible implementation, all band combinations in the first RAT in the second multi-RAT band combination may be included in the first CA band combination.

Alternatively, in a possible implementation, step 503 may be preferentially reporting a third multi-RAT band combination in the first multi-RAT band combination, where a band combination in the first RAT in the third multi-RAT band combination is included in the first CA band combination.

The first RAT and the second RAT are different network standards. In a possible implementation, the multi-RAT multi-connectivity mode may be a multi-RAT dual connectivity (MRDC) mode.

In a possible implementation, the first RAT may be E-UTRA, and the second RAT may be NR. Alternatively, in a possible implementation, the first RAT may be NR, and the second RAT may be E-UTRA.

The UE capability enquiry request message may be sent to the UE in a form of one message or may be sent to the UE in a form of a plurality of messages. For example, the first capability enquiry request information is sent to the UE in one message, and the second capability enquiry request information is sent to the UE in another message.

Similarly, the UE may report the second band combination and the second multi-RAT band combination in one UE capability information message or may report the second band combination and the second multi-RAT band combination in a plurality of UE capability information messages. For example, the second band combination and the second multi-RAT band combination are respectively carried in different UE capability information messages and sent to the access network device.

Figure 6:
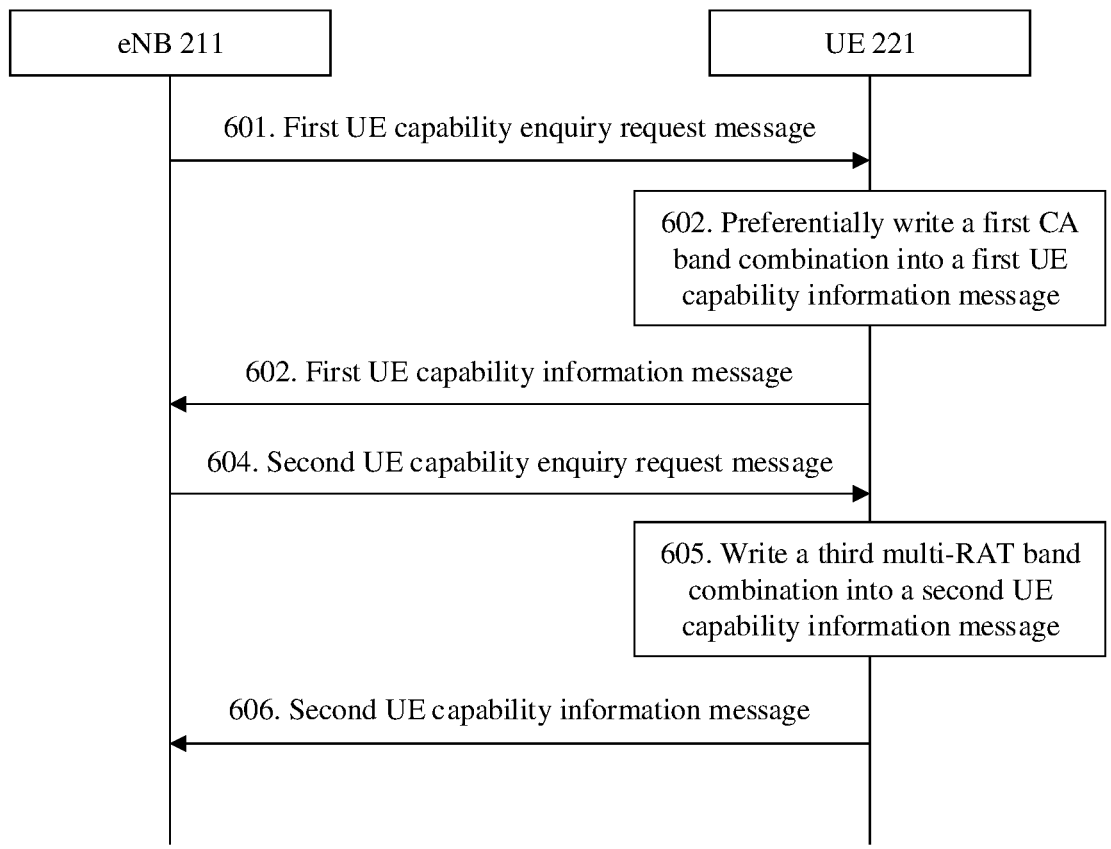
FIG. 6 is a schematic diagram of another embodiment of a UE capability reporting method.

The following uses an example in which the first capability enquiry request information and the second capability enquiry request information are separately sent to the UE in separate UE capability enquiry request messages, and the second band combination and the second multi-RAT band combination that are reported by the UE are separately sent to the access network device in separate UE capability information messages; and uses an example in which the first RAT and the second RAT are respectively E-UTRA and NR, and multi-RAT multi-connectivity between the first RAT and the second RAT is MRDC. An embodiment of the UE capability reporting method is described. As shown in FIG. 6, another embodiment of the UE capability reporting method may include the following steps:

601. An eNB 211 sends a first UE capability enquiry request message to UE 221.

The eNB 211 may send a UE capability enquiry request message to the UE 221, where the UE capability enquiry request message may carry a field "eutra" (which may be understood as the foregoing first capability enquiry request information) and a field "requestedFrequencyBandsNR-MRDC: band 1, band 3, band 7, and band 78" (which may be understood as the foregoing multi-RAT request condition). For ease of differentiation, the UE capability enquiry request message is referred to as the first UE capability enquiry request message.

602. The UE 221 preferentially writes a first CA band combination into a first UE capability information message.

After receiving the first UE capability enquiry request message, the UE 221 may construct a UE capability information message based on the field "eutra" and the field "requestedFrequencyBandsNR-MRDC: band 1, band 3, band 7, and band 78". The UE 221 may write E-UTRA capability information (UE-EUTRA-Capability) of the UE into a UE RAT capability container (ue-CapabilityRAT-Container) and set a RAT type (rat-Type) in the UE RAT capability container to "eutra". In a process of writing the E-UTRA capability information of the UE, a band combination supported by the UE 221 in E-UTRA may be written. In the writing process, compared with a second CA band combination that is in a first band combination and that does not meet the multi-RAT request condition, the first CA band combination may be preferentially written. For ease of differentiation, the UE capability information message constructed in step 602 is referred to as the first UE capability information message.

It is assumed that the UE is allowed to report two band combinations supported in E-UTRA, CA band combinations supported by the UE 221 in E-UTRA include CA_1A-3A, CA_1A-4A, CA_1A-5A, CA_3A-4A, and CA_3A-4C, and the first CA band combination is CA_1A-3A. The UE 221 writes CA_1A-3A and one (for example, CA_1A-4A) of the other CA band combinations into the UE RAT capability container.

603. The UE 221 sends the first UE capability information message to the eNB 211.

The UE 221 may send the first UE capability information message to the eNB 211. Band combinations and a field "rat-Type: eutra" in the UE RAT capability container are used to indicate the eNB 211 to perform E-UTRA configuration on the UE 221 based on one of the band combinations, for example, configure the UE 221 to be in a CA mode based on a CA band combination in the UE RAT capability container.

604. The eNB 211 sends a second UE capability enquiry request message to the UE 221.

The eNB 211 may send a UE capability enquiry request message to the UE 221, where the UE capability enquiry request message may carry a field "eutra-nr" (which may be understood as the foregoing second capability enquiry request information) and a field "requestedFrequencyBandsNR-MRDC: band 1, band 3, band 7, and band 78" (which may be understood as the foregoing multi-RAT request condition). For ease of differentiation, the UE capability enquiry request message is referred to as the second UE capability enquiry request message.

605. The UE 221 writes a third multi-RAT band combination into a second UE capability information message.

After receiving the second UE capability enquiry request message, the UE 221 may construct a UE capability information message based on the field "eutra-nr" and the field "requestedFrequencyBandsNR-MRDC: band 1, band 3, band 7, and band 78". The UE 221 may write UE radio access capability information for E-UTRA and NR (UE radio access capabilities for EUTRA-NR) into a UE RAT capability container (ue-CapabilityRAT-Container) and set a RAT type (rat-Type) in the UE RAT capability container to "eutra-nr". In a process of writing the UE radio access capability information for E-UTRA and NR, a second multi-RAT band combination may be written. Optionally, in the writing process, the third multi-RAT band combination may be written based on the first CA band combination written into the UE RAT capability container in step 602. For ease of differentiation, the UE capability information message constructed in step 605 is referred to as the second UE capability information message.

It is assumed that the UE is allowed to report two multi-RAT band combinations supported in E-UTRA and NR, multi-RAT band combinations supported by the UE 221 in E-UTRA and NR include MRDC_1A-3A-78A, MRDC_1A-4A-77A, MRDC_3A-7A-78A, and MRDC_1A-7A-78A, and the second multi-RAT band combination includes MRDC_1A-3A-78A, MRDC_3A-7A-78A, and MRDC_1A-7A-78A. Based on the first CA band combination (CA_1A-3A) determined by the UE 221 in step 602 or the CA band combinations (CA_1A-3A and CA_1A-4A) written by the UE 221 in step 602, it is determined that the third multi-RAT band combination is MRDC_1A-3A-78A. In this case, the UE 221 writes MRDC_1A-3A-78A into the UE RAT capability container.

606. The UE 221 sends the second UE capability information message to the eNB 211.

The UE 221 may send the second UE capability information message to the eNB 211. Multi-RAT band combinations and a field "rat-Type: eutra-nr" in the UE RAT capability container are used to indicate the eNB 211 to perform E-UTRA-NR configuration on the UE 221 based on one of the band combinations, for example, configure the UE 221 to be in an MRDC mode of E-UTRA and NR based on a multi-RAT band combination in the UE RAT capability container.

When the UE 221 is in a coverage area of a gNB 212, it is assumed that the eNB 211 configures the UE 221 to be in the MRDC mode based on MRDC_1A-3A-78A reported by the UE 221 in step 606, and an SCG of the UE 221 operates in the band 78. When the UE 221 leaves the coverage area of the gNB 212, the eNB 211 may configure the UE 221 to delete the SCG, and configure, based on CA_1A-3A reported by the UE 221 in step 603, the UE 221 to roll back to the CA mode, so that the UE 221 continues to enjoy a high-bandwidth service in the CA mode.

It should be understood that examples in the embodiments are merely intended to help a person skilled in the art better understand the embodiments but are not intended to limit the scope of the embodiments.

It should be understood that sequence numbers of the foregoing processes do not mean execution sequences in various embodiments. The execution sequences of the processes should be determined based on functions and internal logic of the processes but should not be construed as any limitation on the implementation processes in the embodiments.

It may be understood that, to implement the foregoing functions, the UE or the chip in the UE includes a corresponding hardware structure and/or software module for executing the functions. A person skilled in the art should be easily aware that, in combination with functions described in the embodiments, the embodiments may be implemented by hardware or a combination of hardware and computer software. Whether a function is performed by hardware or hardware driven by computer software depends on particular applications and design constraints. A person skilled in the art may use different methods to implement the described functions for each particular application, but it should not be considered that such an implementation goes beyond the scope.

From a perspective of functional modules, division into the functional module may be performed on the UE or the chip in the UE by a person skilled in the art according to the foregoing method embodiments. For example, each functional module may be obtained through division corresponding to each function, or two or more functions may be integrated into one functional module. The integrated functional module may be implemented in a form of hardware or may be implemented in a form of a software function unit.

Figure 7:
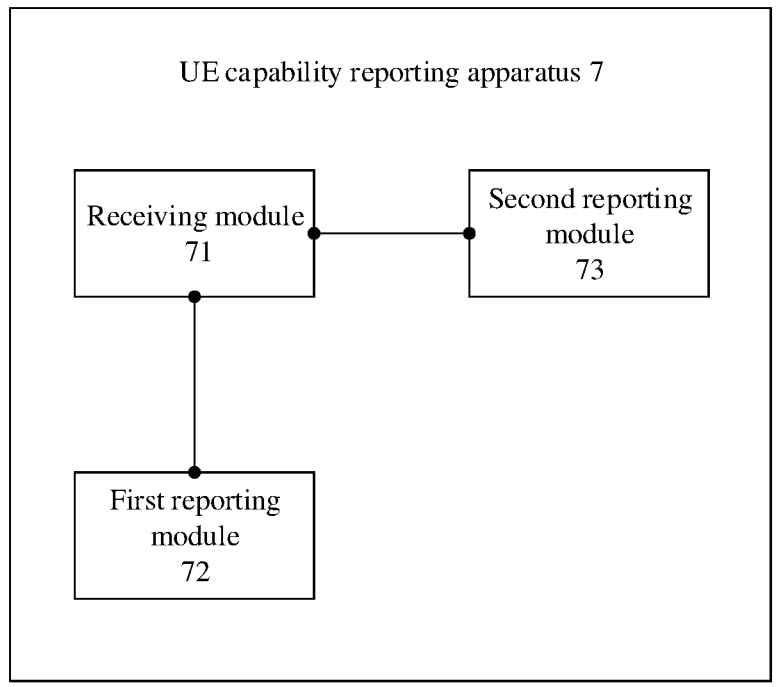
FIG. 7 is a schematic diagram of an embodiment of a UE capability reporting apparatus.

For example, when functional units are divided through integration, FIG. 7 is a schematic diagram of a structure of a UE capability reporting apparatus. As shown in FIG. 7, the UE capability reporting apparatus 7 may include a receiving module 71, a first reporting module 72, and a second reporting module 73.

In an embodiment of the UE capability reporting apparatus 7, the receiving module 71 is configured to receive first capability enquiry request information, second capability enquiry request information, and a multi-RAT request condition, where the first capability enquiry request information is used to indicate UE to report a first band combination supported by the UE in a first radio access technology RAT, and the second capability enquiry request information and the multi-RAT request condition are used to indicate the UE to report a first multi-RAT band combination that is supported by the UE in the first RAT and a second RAT and that meets the multi-RAT request condition. The first reporting module 72 is configured to preferentially report a first carrier aggregation CA band combination in the first band combination based on the first capability enquiry request information and the multi-RAT request condition, where a priority of reporting the first CA band combination is higher than a priority of reporting a second CA band combination in the first band combination, the second CA band combination does not meet the multi-RAT request condition, and the first CA band combination meets the multi-RAT request condition. The second reporting module 73 is configured to report a second multi-RAT band combination in the first multi-RAT band combination based on the second capability enquiry request information and the multi-RAT request condition, where the second multi-RAT band combination is used to configure the UE to be in a multi-connectivity mode of the first RAT and the second RAT.

In a possible implementation, that the first CA band combination meets the multi-RAT request condition includes: The first CA band combination meets a first request condition in the multi-RAT request condition, where the first request condition is a condition that needs to be met by a band combination in the first RAT in the second multi-RAT band combination.

In a possible implementation, the first request condition includes at least one of the following: a quantity of carriers aggregated in the first RAT, maximum carrier bandwidth supported in the first RAT, a band supported in the first RAT, intra-band contiguous CA supported in the first RAT, intra-band non-contiguous CA supported in the first RAT, a combination of inter-band CA supported in the first RAT and intra-band contiguous CA supported in the first RAT, and a combination of inter-band CA supported in the first RAT and intra-band non-contiguous CA supported in the first RAT.

In a possible implementation, the first request condition includes: supporting a first band in the first RAT. That the first CA band combination meets the first request condition includes: All carriers in the first CA band combination are located in the first band.

In a possible implementation, all band combinations in the first RAT in the second multi-RAT band combination are included in the first CA band combination.

In a possible implementation, the second reporting module 73 is configured to preferentially report a third multi-RAT band combination in the first multi-RAT band combination, where a band combination in the first RAT in the third multi-RAT band combination is included in the first CA band combination.

In a possible implementation, the multi-connectivity mode of the first RAT and the second RAT is a multi-RAT dual connectivity MRDC mode of the first RAT and the second RAT.

In a possible implementation, the first RAT is evolved universal terrestrial radio access E-UTRA, and the second RAT is 5th generation new radio NR. Alternatively, the first RAT is NR, and the second RAT is E-UTRA.

In a possible implementation, the first CA band combination includes two carriers.

Figure 8:
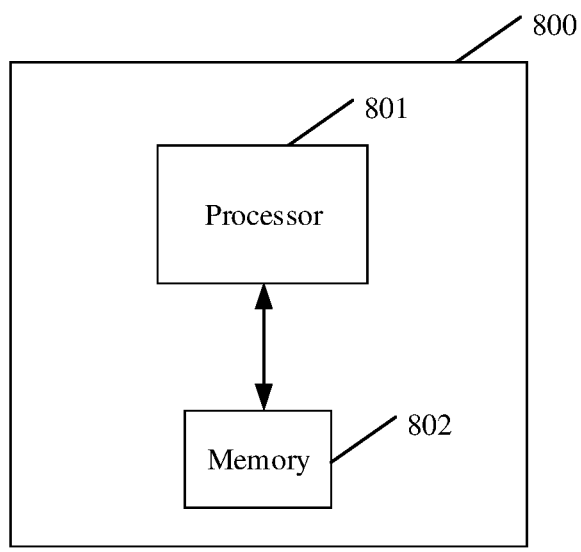
FIG. 8 is a schematic diagram of an embodiment of a computer device.

As shown in FIG. 8, an embodiment further provides a computer device 800, including a processor 801 and a memory 802.

The processor 801 may be a central processing unit (CPU), a network processor (NP), a combination of a CPU and an NP, a digital signal processor (DSP), an application-specific integrated circuit (ASIC), or a field programmable gate array (FPGA) or another programmable logic device, a discrete gate or a transistor logic device, or a discrete hardware component. The processor 801 may implement or perform the methods, steps, and logical block diagrams that are described in the embodiments. A general-purpose processor may be a microprocessor, or the processor may be any conventional processor, or the like. Steps of the methods may be directly executed and completed by using a hardware decoding processor or may be executed and completed by using a combination of hardware and software modules in the decoding processor. The software module may be located in a storage medium mature in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor. Although only one processor is shown in the figure, the apparatus may include a plurality of processors, or the processor includes a plurality of processing units. The processor 801 may be a single-core processor or may be a multi-core or many-core processor. The processor 801 may be an ARM architecture processor.

The memory 802 is configured to store computer instructions executed by the processor. The memory 802 may be a storage circuit or may be a memory. The memory 802 may be a volatile memory or a nonvolatile memory or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. The memory 802 may be independent of the processor 801. In a possible implementation, the processor 801 and the memory 802 may be connected to each other through a bus. The bus may be a peripheral component interconnect (PCI) bus or an extended industry standard architecture (EISA) bus, or the like. The bus may be classified into an address bus, a data bus, a control bus, or the like. Alternatively, the memory 802 may be a storage unit in the processor 801 and is directly attached to the processor 801. This is not limited herein. Although only one memory 802 is shown in the figure, the apparatus may alternatively include a plurality of memories 802, or the memory 802 includes a plurality of storage units.

The memory 802 is configured to store computer-executable instructions for performing the solutions, and the processor 801 controls execution. The processor 801 is configured to execute the computer-executable instruction stored in the memory 802, to implement the method provided in any one of the foregoing method embodiments.

In a possible implementation, the computer-executable instructions in this embodiment may also be referred to as application code. This is not limited in this embodiment.

In an example, the UE capability reporting apparatus 7 may be implemented in a form of a computer device and may be implemented in a form of UE. The receiving module 71 in the UE capability reporting apparatus 7 may be a transceiver. The first reporting module 72 and the second reporting module 73 may include, for example, a processor and a transceiver. The transceiver may include a radio frequency circuit. Optionally, the UE capability reporting apparatus 7 may further include a memory. The memory is configured to store computer instructions. The processor is connected to the memory, and the processor executes the computer instructions stored in the memory, so that the UE capability reporting apparatus 7 performs the method in the foregoing embodiments. The processor in a computer device may perform baseband processing and radio frequency processing on a signal. The transceiver, for example, an antenna, may receive and send a signal.

Figure 9:
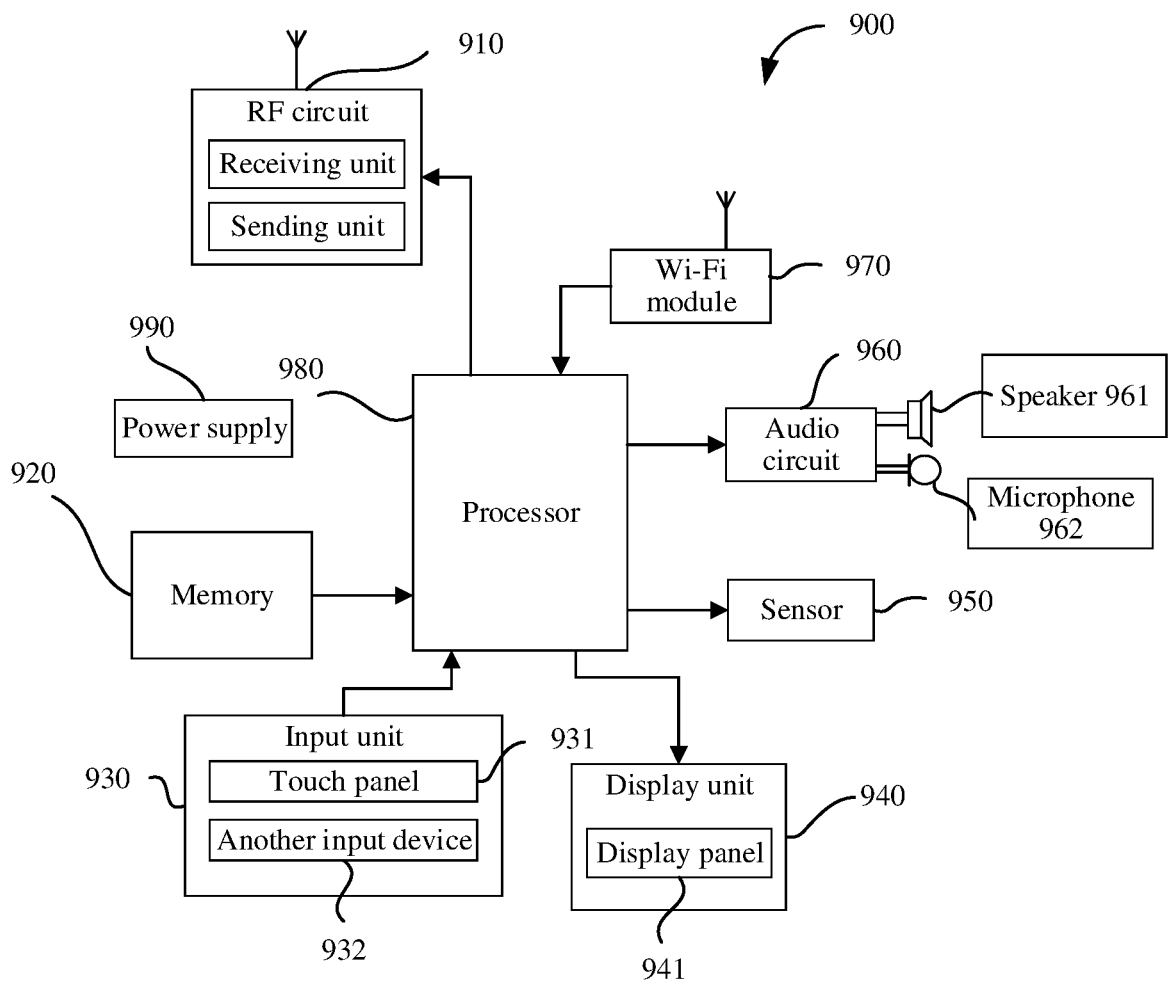
FIG. 9 is a schematic diagram of another embodiment of a computer device.

FIG. 9 is another schematic diagram of the computer device. The UE capability reporting apparatus 7 may be the computer device 900 shown in FIG. 9. The computer device 900 may include components such as a radio frequency (RF) circuit 910 of a processor, a memory 920, an input unit 930, a display unit 940, a sensor 950, an audio circuit 960, a wireless fidelity (Wi-Fi) module 970, the processor 980, and a power supply 990.

A person skilled in the art may understand that the structure of the computer device shown in FIG. 9 does not constitute a limit to the computer device, and the computer device may include more or fewer components than those shown in FIG. 9, or has a combination of some components, or has different layouts of the components.

Components of the computer device 900 are described in the following with reference to FIG. 9.

The RF circuit 910 may be configured to receive and send a signal in an information receiving or sending process or a call process. In particular, after receiving downlink information of a network side device, the RF circuit 910 sends the downlink information to the processor 980 for processing and sends uplink data to the network side device.

Usually, the RF circuit 910 includes, but is not limited to, an antenna, at least one amplifier, a transceiver, a coupler, a low noise amplifier (LNA), a duplexer, and the like.

In addition, the RF circuit 910 may further communicate with a network and another device through wireless communication.

Any communication standard or protocol may be used for the wireless communication and includes but is not limited to a global system for mobile communication (GSM), a general packet radio service (GPRS) system, a code division multiple access (CDMA) system, a wideband code division multiple access (WCDMA) system, a long term evolution (LTE) system, an email, a short message service (SMS), and the like.

The memory 920 may be configured to store a software program and a module. The processor 980 performs, by running the software program and the module that are stored in the memory 920, various function applications of the computer device and data processing.

The memory 920 may include a program storage area and a data storage area. The program storage area may store an operating system, an application program required by at least one function, and the like. The data storage area may store data created based on use of the computer device, and the like. In addition, the memory 920 may include a high-speed random access memory, and may further include a nonvolatile memory, such as at least one magnetic disk storage component, a flash memory component, or another volatile solid-state storage component.

The input unit 930 may be configured to: receive entered digit or character information and generate key signal input related to user setting and function control of the computer device.

The input unit 930 may include a touch panel 931 and another input device 932. The touch panel 931, also referred to as a touchscreen, can collect a touch operation of a user on or near the touch panel 931 (for example, an operation of the user on the touch panel 931 or near the touch panel 931 by using any proper object or accessory such as a finger or a stylus), and drive a corresponding connected apparatus according to a preset program. In addition to the touch panel 931, the input unit 930 may further include the another input device 932. The another input device 932 may include but is not limited to one or more of a physical keyboard, a function key (for example, a volume control key or an on/off key), a trackball, a mouse, or a joystick.

The display unit 940 may be configured to display information entered by the user or information provided for the user, and various menus of the computer device. The display screen 940 may include a display panel 941. Optionally, the display panel 941 may be configured in a form of a liquid crystal display (LCD), an organic light-emitting diode (OLED), or the like. Further, the touch panel 931 may cover the display panel 941. When detecting a touch operation on or near the touch panel 931, the touch panel 931 transfers the touch operation to the processor 980 to determine a type of a touch event, and then the processor 980 provides corresponding visual output on the display panel 941 according to the type of the touch event. In FIG. 9, although the touch panel 931 and the display panel 941 are used as two independent components to implement input and output functions of the computer device, in some embodiments, the touch panel 931 and the display panel 941 may be integrated to implement the input and output functions of the computer device.

The computer device may further include at least one sensor 950, such as a light sensor, a motion sensor, or another sensor. The light sensor may include an ambient light sensor and a proximity sensor, where the ambient light sensor may display brightness of the display panel 941 according to light and shade of the ambient light, and the proximity sensor may close the display panel 941 and/or a backlight when the computer device is moved closer to an ear. As a motion sensor, an accelerometer sensor may detect values of acceleration in all directions (usually, three axes), may detect a value and a direction of gravity when the accelerometer sensor is static, and may be used in an application for recognizing a posture (such as switching between landscape mode and portrait mode, a related game, or magnetometer posture calibration) of the computer device, a function related to vibration recognition (such as a pedometer or a knock), or the like. For another sensor such as a gyro, a barometer, a hygrometer, a thermometer, or an infrared sensor that may be further disposed on the computer device, details are not described herein.

A loudspeaker 961 and a microphone 962 may provide an audio interface between the user and the computer device. The audio circuit 960 may transmit, to the loudspeaker 961, a received electrical signal obtained after audio data conversion, and the loudspeaker 961 converts the electrical signal to a sound signal for output. In another aspect, a collected sound signal is converted by the microphone 962 to an electrical signal and then is received by the audio circuit 960 and converted to audio data, and the audio data is output to the processor 980 for processing and then is sent to, for example, another device by using the RF circuit 910, or the audio data is output to the memory 920 for further processing.

Wi-Fi belongs to a short distance wireless transmission technology. The computer device may help, by using the Wi-Fi module 970, the user may receive and send emails, browse a web page, access streaming media, and the like. The Wi-Fi module 970 provides wireless broadband internet access for the user. Although the Wi-Fi module 970 is shown in FIG. 9, it can be understood that the Wi-Fi module 970 is not a necessity of the computer device and may be omitted as required.

The processor 980 is a control center of the computer device and is connected to components of the entire computer device by using various interfaces and lines. The processor 980 runs or executes the software program and/or module stored in the memory 920 and invokes data stored in the memory 920, to perform various functions and data processing of the computer device, so as to perform overall monitoring on the computer device. The processor 980 may be a central processing unit (CPU), a network processor (NP), a combination of a CPU and an NP, a digital signal processor (DSP), an application-specific integrated circuit (ASIC), or a field programmable gate array (FPGA) or another programmable logic device, a discrete gate or a transistor logic device, or a discrete hardware component. The processor 980 may implement or perform the methods, steps, and logical block diagrams that are disclosed in the embodiments. A general-purpose processor may be a microprocessor, or the processor may be any conventional processor, or the like. Steps of the methods in the embodiments may be directly executed and completed by using a hardware decoding processor or may be executed and completed by using a combination of hardware and software modules in the decoding processor. The software module may be located in a storage medium mature in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor. Although only one processor is shown in the figure, the apparatus may include a plurality of processors, or the processor includes a plurality of processing units. The processor 980 may be a single-core processor or may be a multi-core or many-core processor. The processor 980 may be an ARM architecture processor. Optionally, an application processor and a modem processor may be integrated in the processor 980. The application processor processes an operating system, a user interface, an application program, and the like. The modem processor processes wireless communication. It may be understood that the modulation and demodulation processor may not be integrated into the processor 980.

The computer device further includes the power supply 990 (such as a battery) that supplies power to all components. The power supply 990 may be logically connected to the processor 980 by using a power supply management system, to implement functions such as charging and discharging management and power consumption management by using the power supply management system.

Although not shown in the figure, the computer device may further include a camera, a Bluetooth module, and the like, and details are not described herein.

The computer device provided in the embodiments may be a mobile phone, a tablet computer, a desktop computer, a wearable device (for example, a smart watch), a smart home device (for example, a smart stereo or a smart television), a vehicle-mounted smart device, a driverless device, a virtual reality device, an augmented reality device, a mixed reality device, an artificial intelligence device, or the like.

Figure 10:
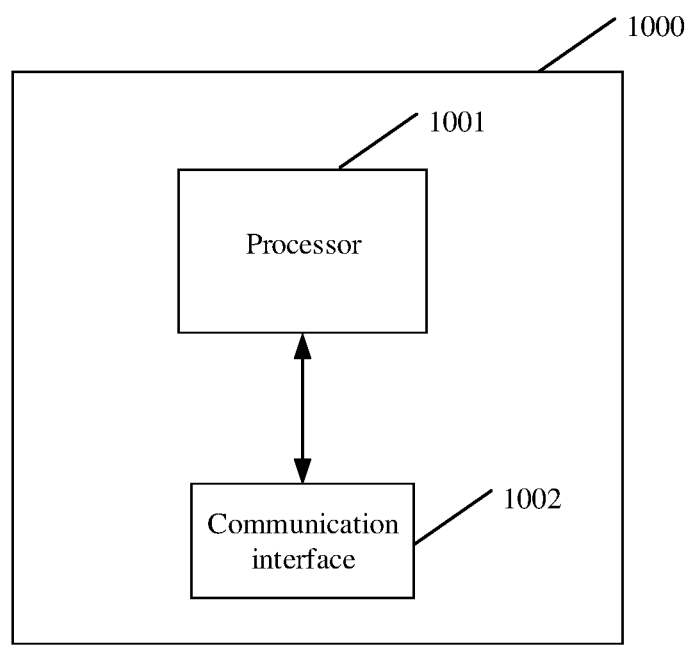
FIG. 10 is a schematic diagram of an embodiment of a chip.

As shown in FIG. 10, an embodiment further provides a chip 1000, including a processor 1001 and a communication interface 1002. The communication interface 1002 is coupled to the processor 1001. The processor 1001 is configured to run a computer program or instructions, to implement the method provided in any one of the foregoing method embodiments.

In an example, the communication interface 1002 (or referred to as an interface circuit) may be, for example, an input/output interface, a pin, or a circuit on the chip 1000. The processor 1001 may execute computer instructions stored in the memory, so that the chip 1000 performs any one of the foregoing method embodiments. Optionally, the memory may be a storage unit in the chip 1000, such as a register or a cache; or the memory may be a memory that is in the computer device and that is located outside the chip 1000, such as a read-only memory (ROM), another type of static storage device that may store static information and instructions, or a random access memory (RAM). Optionally, the processor 1001 may be a general-purpose central processing unit (CPU), a microprocessor, an application-specific integrated circuit (ASIC), or one or more integrated circuits configured to control program execution of any one of the foregoing method embodiments.

The chip 1000 may be a baseband chip or a system-on-a-chip (SoC) or include a baseband chip and a SoC. For example, the chip 1000 is a SoC. The SoC may include an interface circuit, a processor, and a memory. The communication interface 1002 in the SoC is configured to support communication between the UE capability reporting apparatus 7 and an access network device. The memory in the SoC may be configured to store a software program and a module. The processor 1001 runs the software program and the module stored in the memory, to perform various functions of the UE and data processing. For example, the communication interface 1002 may be connected to components including but not limited to an antenna, at least one amplifier, a transceiver, a coupler, a low noise amplifier (LNA), a duplexer, and the like.

The SoC may implement any one of the foregoing method embodiments. The following describes, by using an example, a process in which the SoC implements the embodiment corresponding to FIG. 5.

The communication interface 1002 in the SoC may receive a radio frequency signal (that is, a UE capability enquiry request message) sent by the access network device, convert the radio frequency signal into a digital baseband signal, and provide the digital baseband signal for the processor 1001 in the SoC for processing. The processor 1001 in the SoC may demodulate and decode the baseband signal to obtain the first capability enquiry request information, the second capability enquiry request information, and the multi-RAT request condition. Then, the processor 1001 may generate UE capability information by running the software program and the module stored in the memory and encode and modulate the UE capability information to obtain a modulated digital baseband signal. The UE capability information includes a second band combination (which may include a first CA band combination) and a second multi-RAT band combination and provides the digital baseband signal to the interface circuit for processing. The interface circuit may convert the modulated digital baseband signal into a radio frequency signal, and send the radio frequency signal (namely, the UE capability information).

All or some of the foregoing embodiments may be implemented by using software, hardware, firmware, or any combination thereof. When the software is used for implementation, all or some of embodiments may be implemented in a form of a computer program product.

The computer program product includes one or more computer instructions. When the computer-executable instructions are loaded and executed on a computer, the procedure or functions according to the embodiments are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a DSL) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The embodiments further provide a UE capability reporting system that may include an access network device and UE communicating with the access network device. The UE is configured to perform any one of the foregoing method embodiments. For example, refer to FIG. 2. The system for reporting a UE capability may include an eNB 211, a gNB 212, and UE 221.

In the embodiments, the terms "first", "second", and the like are intended to distinguish between similar objects but do not necessarily indicate a specific order or sequence. It should be understood that the terms used in such a way are interchangeable in proper circumstances, and this is merely a distinguishing manner used when objects having a same attribute are described in the embodiments. In addition, terms "include", "have", and any other variants thereof mean to cover the non-exclusive inclusion, so that a process, method, system, product, or device that includes a series of units is not necessarily limited to those units but may include other units not expressly listed or inherent to such a process, method, product, or device. In the embodiments, "a plurality of" means two or more than two.

In the embodiments, the word "example" or "for example" or the like is used to represent giving an example, an illustration, or a description. Any embodiment described as an "example" or "for example" in the embodiments should not be explained as being more preferred or having more advantages than another embodiment. Use of the words such as "example" or "for example" is intended to present a related concept.

In the embodiments, for ease of understanding, a plurality of examples may be used for description. However are merely examples.

The embodiments are described in detail above. The principles and implementations are described through examples. The description is merely provided to help understand the method and core ideas. In addition, a person of ordinary skill in the art can make variations and modifications in terms of implementations and application scopes based on the ideas.

What is claimed is:

1. A user equipment (UE) capability reporting method comprising:
receiving first capability enquiry request information, second capability enquiry request information, and a multi-RAT request condition, wherein the first capability enquiry request information is used to indicate UE to report a first band combination supported by the UE in a first radio access technology (RAT), and the second capability enquiry request information and the multi-RAT request condition are used to indicate the UE to report a first multi-RAT band combination that is supported by the UE in the first RAT and a second RAT and that meets the multi-RAT request condition;
reporting a first carrier aggregation (CA) band combination in the first band combination based on the first capability enquiry request information and the multi-RAT request condition, wherein a priority of reporting the first CA band combination is higher than a priority of reporting a second CA band combination in the first band combination, the second CA band combination does not meet the multi-RAT request condition, and the first CA band combination meets the multi-RAT request condition; and
reporting a second multi-RAT band combination in the first multi-RAT band combination based on the second capability enquiry request information and the multi-RAT request condition, wherein the second multi-RAT band combination is used to configure the UE to be in a multi-connectivity mode of the first RAT and the second RAT.

2. The UE capability reporting method according to claim 1, wherein that the first CA band combination meets the multi-RAT request condition further comprises:
the first CA band combination meets a first request condition in the multi-RAT request condition, wherein the first request condition is a condition that needs to be met by a band combination in the first RAT in the second multi-RAT band combination.

3. The UE capability reporting method according to claim 2, wherein the first request condition comprises at least one of the following:
a quantity of carriers aggregated in the first RAT,
a maximum carrier bandwidth supported in the first RAT,
a band supported in the first RAT, intra-band contiguous CA supported in the first RAT,
intra-band non-contiguous CA supported in the first RAT,
a combination of inter-band CA supported in the first RAT and intra-band contiguous CA supported in the first RAT, and
a combination of inter-band CA supported in the first RAT and intra-band non-contiguous CA supported in the first RAT.

4. The UE capability reporting method according to claim 3, wherein the first request condition further comprises:
supporting a first band in the first RAT, wherein all carriers in the first CA band combination are located in the first band.

5. The UE capability reporting method according to claim 1, wherein all band combinations in the first RAT in the second multi-RAT band combination are comprised in the first CA band combination.

6. The UE capability reporting method according to claim 1, wherein the reporting the second multi-RAT band combination in the first multi-RAT band combination based on the second capability enquiry request information and the multi-RAT request condition further comprises:
reporting a third multi-RAT band combination in the first multi-RAT band combination, wherein a band combination in the first RAT in the third multi-RAT band combination is comprised in the first CA band combination.

7. The UE capability reporting method of claim 1, wherein the multi-connectivity mode of the first RAT and the second RAT is a multi-RAT dual connectivity (MRDC) mode of the first RAT and the second RAT.

8. The UE capability reporting method according to claim 7, wherein
the first RAT is evolved universal terrestrial radio access (E-UTRA), and the second RAT is 5th generation new radio (NR); or
the first RAT is NR, and the second RAT is E-UTRA.

9. The UE capability reporting method according to claim 1, wherein the first CA band combination comprises two carriers.

10. A user equipment (UE) capability reporting apparatus, comprising at least one processor and a memory, wherein:
the memory is configured to store a computer program, and when the computer program is executed by the at least one processor, cause the at least one processor to:
receive first capability enquiry request information, second capability enquiry request information, and a multi-RAT request condition, wherein the first capability enquiry request information is used to indicate UE to report a first band combination supported by the UE in a first radio access technology (RAT), and the second capability enquiry request information and the multi-RAT request condition are used to indicate the UE to report a first multi-RAT band combination that is supported by the UE in the first RAT and a second RAT and that meets the multi-RAT request condition;
report a first carrier aggregation (CA) band combination in the first band combination based on the first capability enquiry request information and the multi-RAT request condition, wherein a priority of reporting the first CA band combination is higher than a priority of reporting a second CA band combination in the first band combination, the second CA band combination does not meet the multi-RAT request condition, and the first CA band combination meets the multi-RAT request condition; and
report a second multi-RAT band combination in the first multi-RAT band combination based on the second capability enquiry request information and the multi-RAT request condition, wherein the second multi-RAT band combination is used to configure the UE to be in a multi-connectivity mode of the first RAT and the second RAT.

11. The UE capability reporting apparatus according to claim 10, wherein that the first CA band combination meets the multi-RAT request condition further comprises:
the first CA band combination meets a first request condition in the multi-RAT request condition, wherein the first request condition is a condition that needs to be met by a band combination in the first RAT in the second multi-RAT band combination.

12. The UE capability reporting apparatus according to claim 11, wherein the first request condition comprises at least one of the following:
a quantity of carriers aggregated in the first RAT,
a maximum carrier bandwidth supported in the first RAT,
a band supported in the first RAT, intra-band contiguous CA supported in the first RAT,
intra-band non-contiguous CA supported in the first RAT,
a combination of inter-band CA supported in the first RAT and intra-band contiguous CA supported in the first RAT, and
a combination of inter-band CA supported in the first RAT and intra-band non-contiguous CA supported in the first RAT.

13. The UE capability reporting apparatus according to claim 12, wherein the first request condition further comprises:
supporting a first band in the first RAT, wherein all carriers in the first CA band combination are located in the first band.

14. The UE capability reporting apparatus according to claim 10, wherein all band combinations in the first RAT in the second multi-RAT band combination are comprised in the first CA band combination.

15. The UE capability reporting apparatus according to claim 10, wherein the second reporting module is further configured to:
report a third multi-RAT band combination in the first multi-RAT band combination, wherein a band combination in the first RAT in the third multi-RAT band combination is comprised in the first CA band combination.

16. The UE capability reporting apparatus of claim 10, wherein the multi-connectivity mode of the first RAT and the second RAT is a multi-RAT dual connectivity (MRDC) mode of the first RAT and the second RAT.

17. The UE capability reporting apparatus according to claim 16, wherein
the first RAT is evolved universal terrestrial radio access (E-UTRA), and the second RAT is 5th generation new radio (NR); or
the first RAT is NR, and the second RAT is E-UTRA.

18. The UE capability reporting apparatus according to claim 10, wherein the first CA band combination comprises two carriers.

19. A non-transitory computer-readable storage medium, comprising instructions, wherein when the instructions are run on a computer, the computer is enabled to perform the method, comprising:
receiving first capability enquiry request information, second capability enquiry request information, and a multi-RAT request condition, wherein the first capability enquiry request information is used to indicate UE to report a first band combination supported by the UE in a first radio access technology (RAT), and the second capability enquiry request information and the multi-RAT request condition are used to indicate the UE to report a first multi-RAT band combination that is supported by the UE in the first RAT and a second RAT and that meets the multi-RAT request condition;
reporting a first carrier aggregation (CA) band combination in the first band combination based on the first capability enquiry request information and the multi-RAT request condition, wherein a priority of reporting the first CA band combination is higher than a priority of reporting a second CA band combination in the first band combination, the second CA band combination does not meet the multi-RAT request condition, and the first CA band combination meets the multi-RAT request condition; and
reporting a second multi-RAT band combination in the first multi-RAT band combination based on the second capability enquiry request information and the multi-RAT request condition, wherein the second multi-RAT band combination is used to configure the UE to be in a multi-connectivity mode of the first RAT and the second RAT.

20. A non-transitory computer-readable storage medium according to claim 19, wherein that the first CA band combination meets the multi-RAT request condition further comprises:
the first CA band combination meets a first request condition in the multi-RAT request condition, wherein the first request condition is a condition that needs to be met by a band combination in the first RAT in the second multi-RAT band combination.

* * * * *